Sept. 6, 1949.  J. A. SNYDER  2,481,253
METHOD OF REMOVING CONTAMINANTS
FROM CRACKING CATALYSTS
Filed Sept. 19, 1947
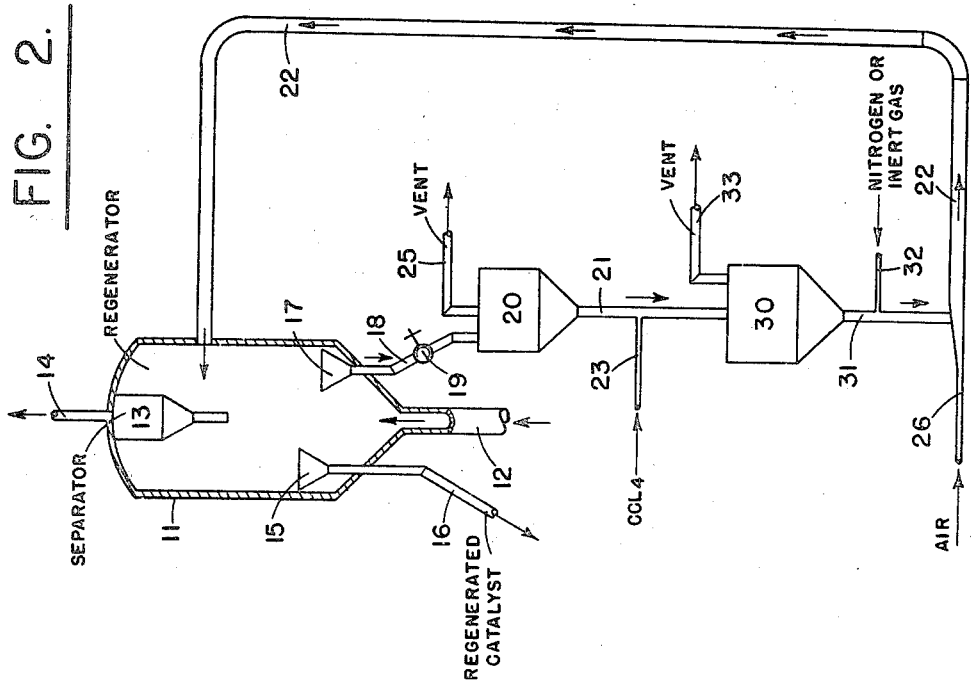
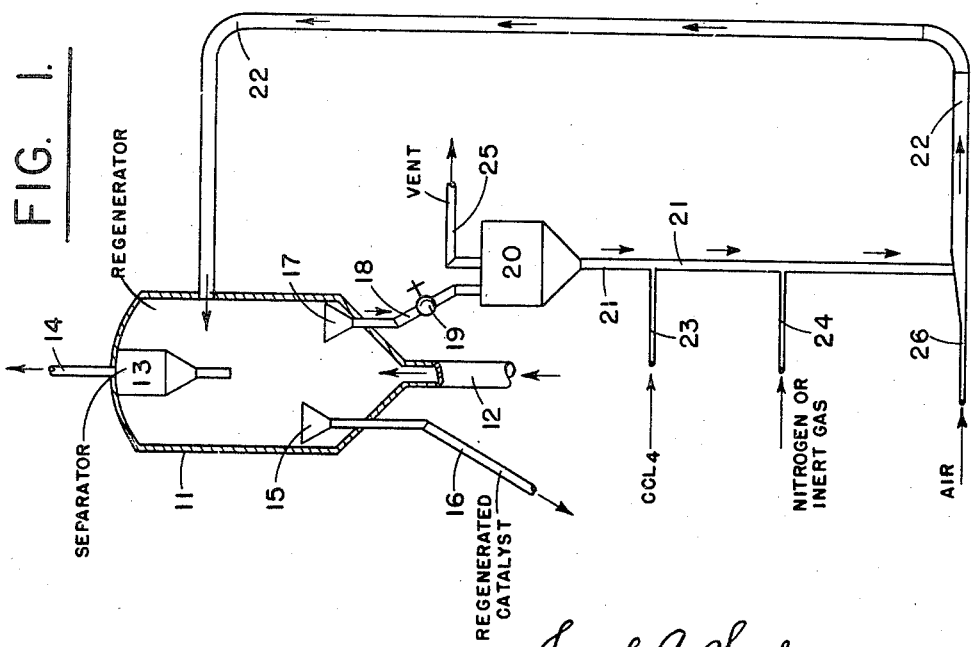
Joseph A. Snyder, INVENTOR.
BY
ATTORNEY.

Patented Sept. 6, 1949

2,481,253

UNITED STATES PATENT OFFICE 2,481,253

METHOD OF REMOVING CONTAMINANTS FROM CRACKING CATALYSTS

Joseph A. Snyder, Baytown, Tex., assignor, by mesne assignments, to Standard Oil Development Company, Elizabeth, N. J., a corporation of Delaware Application September 19, 1947, Serial No. 775,015

1 Claim. (Cl. 196—52)

The present invention is directed to a method for catalytic cracking employing a fluidized solid catalyst. More particularly, the invention is concerned with a catalytic cracking process in which the catalyst is regenerated and treated to improve its activity.

It is known to the art to treat hydrocarbons with finely divided solid catalyst in processes involving a reaction zone and a regenerating zone. These processes may be generally described as involving contacting hydrocarbons with the finely divided solid catalyst in the reaction zone under suitable physical conditions to cause the cracking of a substantial portion of the hydrocarbons charged to the reaction zone, the removal of finely divided spent catalyst and converted hydrocarbons from the reaction zone and the subsequent regeneration of the spent catalyst in a regeneration zone in the presence of combustion gases. The regenerated catalyst may then be recycled to the reaction zone.

The present invention is directed to a catalytic cracking process involving a finely divided or fluidized solid catalyst and is particularly directed to an improvement in the step of regenerating the spent catalyst to obtain a regenerated catalyst of substantially improved activity over that conventionally obtained in the cracking art when employing a fluidized solid catalyst.

The feature of the present invention may be described briefly as involving the regeneration of the fluidized solid catalyst in the presence of combustion gases, the withdrawal of at least a substantial portion of the solid catalyst from contact with the hot combustion gases, the contacting of the withdrawn portion of the catalyst with vaporized carbon tetrachloride at temperatures within the range of 600° to 1200° F. to remove at least a substantial portion of metallic contaminating materials from the catalyst, the separation of at least a major portion of the carbon tetrachloride vapors from the treated catalyst and the return of the treated catalyst to the regeneration zone. It will be understood that in this process catalyst from the regeneration zone is returned to the reaction zone and serves as catalyst in the latter zone.

In conventional catalytic cracking processes employing a fluidized solid catalyst, the catalyst is circulated continuously through the system. The circulating cycle involves passing catalyst to the reaction zone, withdrawal of spent catalyst from the reaction zone to the regeneration zone and the return of the regenerated catalyst to the reaction zone. In the regeneration zone the catalyst is contacted with a combustion gas at relatively high temperature in order to remove carbonaceous material therefrom and the combustion gases are necessarily removed from the regeneration zone. The combustion gases removed from the regeneration zone invariably remove at least small portions of catalyst from the zone and fresh catalyst must therefore be added to the system to compensate for the catalyst lost. It will be understood that the major portion of the catalyst remains in the system for extended intervals of time and as it is recirculated it becomes contaminated with metallic constituents. Such metallic contaminants may be introduced with the feed stock or eroded from the equipment; the metallic materials employed in the construction of the catalytic cracking unit may cause the catalyst to be contaminated with iron, nickel and chromium. The contaminating metals present in the catalyst affect undesirably the cracking reaction in that they cause increased production of dry gas and carbon.

In accordance with the present invention, the fluidized solid catalyst is treated to remove metallic contaminants therefrom in order to obtain an improved regenerated catalyst.

In accordance with the present invention the metallic contaminants are removed from the catalyst being circulated through the catalytic cracking system by intimately contacting the contaminated catalyst with vaporized carbon tetrachloride at a temperature no lower than about 600° F. In order to prevent the deleterious effects caused by exposure of catalyst to unduly high temperatures, it is desirable that the catalyst be subjected to a temperature no greater than approximately 1200° F.

Briefly then, the present invention may be described as a process involving a fluidized catalytic cracking operation in which a reaction of hydrocarbons is carried out in the presence of a finely divided catalyst to form a product. The product is separated from the catalyst and the catalyst is subjected to a regeneration treatment under combustion conditions at temperatures in the range between about 850° to 1200° F. A portion or all of the regenerated catalyst may then be subjected to a treatment with a halogenated derivative of a hydrocarbon such as carbon tetrachloride, methyl chloride, ethylene chloride, ethyl chloride, the corresponding bromides and fluorides, and the like. The catalyst which has been treated with the halogenated derivative of a hydrocarbon may then be purged with an inert gas such as nitrogen or other gas unreactive with the catalyst to remove residual halogenated hydrocarbon derivative from the catalyst following which the catalyst is returned again to the system, particularly to the regenerator where it follows the usual cycle of the process.

The invention will now be described in greater detail in conjunction with the drawing in which;

Fig. 1 is a front elevation, in partial section, of apparatus suitable for use in carrying out the invention; and Fig. 2 is a front elevation, in partial section, of another arrangement of apparatus suitable for use in carrying out the invention.

In the two figures of the drawing corresponding portions are numbered identically.

Referring now to the drawing and first to Fig. 1, the invention may be carried out in the apparatus shown. In the drawing, a regenerator 11 is provided with an inlet line 12 discharging into the lower end thereof. The cyclone separator 13 is provided in the upper end of vessel 11 and from the separator is an outlet 14 for the separated combustion products. A first funnel 15 is arranged at the bottom of the regenerator to collect regenerated catalyst dropping to the bottom thereof and in turn is connected to a discharge pipe 16 which may discharge to a reactor, not shown. It will be understood that other parts of the apparatus, including a reactor connected to pipe 16 and a suitable separating device such as a Cottrell precipitator connected to line 14, are conventional to the art and are not shown in the drawing for the purpose of simplifying the description. The arrangement of a complete catalytic cracking unit, including reaction zones and regeneration zones, is known to the art and is shown, for example, in the patent to Conrad H. Kollenberg, U. S. 2,407,374 issued September 10, 1946, and entitled, "Catalytic cracking process."

Within regenerator 11 is also arranged a second funnel 17 which discharges into line 18 controlled by valve 19 which in turn discharges into vessel 20. The lower portion of vessel 20 is in the form of a cone and discharges into a vertical downwardly extending pipe 21. Pipe 21 is fluidly connected to a pipe 22 which serves as a recycle line and discharges into regenerator vessel 11 at approximately midpoint of the vessel. Inlet 23 serves to introduce vaporized carbon tetrachloride at an elevated temperature at a point below vessel 20 and inlet 24 serves to introduce nitrogen or other inert gas into pipe 21 at a point below inlet 23. It may be understood that both the vaporized carbon tetrachloride and the inert gas discharged into line 21 by way of inlet 23 and 24, respectively, are heated to a temperature preferably in the range between 600° to 1200° F. and pass upwardly through line 21 counter-currently to the downwardly moving fluidized solid catalyst. The mixture of vaporized carbon tetrachloride and inert gas may be removed from vessel 20 by outlet vent line 25. As the fluidized finely divided catalyst reaches the lower end of vertical pipe 21, it is admixed with a heated stream of air or other oxygen-containing gas introduced into line 22 through inlet 26 and the heated air serves to carry the treated catalyst through recycle line 22 and thence back to regenerator vessel 11.

In the arrangement described with reference to Fig. 2 similar parts have been numbered to correspond to identical parts of Fig. 1. In this mode of practicing the invention the portion of the catalyst withdrawn from regenerator vessel 11 by funnel 17 which discharges by line 18 controlled by valve 19 into vessel 20, is treated with vaporized carbon tetrachloride or other halogenated derivative which is introduced into line 21 by inlet 23. The catalyst flowing through vertical pipe 21 is treated by the ascending carbon tetrachloride vapors which pass outwardly from the system by way of vent line 25. The vaporized carbon tetrachloride discharged by vent line 25 may be routed to a suitable recovery system for substantially complete recovery of the carbon tetrachloride without contamination with bodies other than the material which may be removed from the catalyst.

The catalyst which may contain residual carbon tetrachloride drops downwardly into a second vessel 30 which is similar to vessel 20 and terminates into a cone. Vessel 30 is connected by line 31 with line 22 and thus allows recycling of the treated catalyst to regenerator vessel 11. Line 31 is provided with an inlet line 32 for introduction of nitrogen or other inert gas. The inert gas introduced by line 32 contacts the descending catalyst from vessel 30 and removes residual carbon tetrachloride therefrom. The inert gas is vented from vessel 30 by line 33. The catalyst dropping into line 22 from line 31 is met by a stream of air or other free oxygen-containing gas introduced by line 26 and is carried back into the regenerator vessel 11.

In the arrangement shown with respect to Fig. 1, it will be seen that a substantial portion of the catalyst may be treated, in vessel 20 and line 21, with vaporized carbon tetrachloride which serves to remove contaminating bodies from the catalyst and to reactivate it for the catalytic cracking reaction. The vaporized carbon tetrachloride issues from vessel 20 by line 25 contaminated with inert gas. This stream may be routed to a suitable recovery system for the vaporized carbon tetrachloride. The problem, however, may be complicated by the presence of the inert gas. It will be seen that the mode of practicing the invention described with reference to Fig. 2, while requiring extra equipment, allows the recovery of the vaporized carbon tetrachloride substantially uncontaminated with other materials.

In the arrangement shown in the drawing, it will be seen that a substantial portion of the catalyst in the regenerator system is continuously being treated with vaporized carbon tetrachloride at high temperatures in order to reduce the amount of metallic contaminants therein. It will be obvious that the portion of the catalyst circulated through the system which is treated to reduce the metallic contaminants may be varied over a considerable range. If desired, all of the catalyst sent to the regenerator zone may be contacted with vaporized carbon tetrachloride at high temperatures but usually it will be found that the treatment of a minor portion of the catalyst in the regenerator zone will produce satisfactory results. It may be stated that usually it will be desirable to treat from 0.05 to 10% of the catalyst sent to the regenerator zone with vaporized carbon tetrachloride at high temperatures for the purpose of removing metallic contaminants therefrom.

The amount of halogenated hydrocarbon derivative employed in the practice of the present invention will vary depending on the amount of metallic contaminants in the catalyst. For example, when carbon tetrachloride is employed, the amount of carbon tetrachloride injected into line 23 may vary from an amount equivalent to the amount of metallic contaminant, such as iron oxide, contained in the catalyst to an amount sufficient to give a vapor velocity in pipe 21 of 1.5 feet per second.

It may be stated that the practice of the present invention allows a substantial reduction in the amount of metallic contaminants present in the catalyst. It is believed that the vaporized halogenated hydrocarbon derivative reacts with contaminating metals and metal compounds, such as iron oxide, to form the corresponding halides which are volatile and which may be swept out of the system by vent line 25. The inert gas, such as nitrogen, removes residual metallic halides, vaporized halogenated hydrocarbon derivatives, and other contaminating materials either through vent line 25 or through vent line 33 depending on which mode of practicing the invention is employed.

As a specific example, a portion of regenerated catalyst which had been regenerated under conditions equivalent to those obtaining in regenerator 11 was treated at 600° F. for 4 hours with carbon tetrachloride. The iron oxide content of the catalyst before treatment with carbon tetrachloride was 0.59 weight per cent. After treatment with vaporized carbon tetrachloride, the iron oxide content of the catalyst was 0.32 weight per cent.

It will be seen that treatment of a finely divided catalyst with vaporized carbon tetrachloride substantially reduced the iron oxide content.

It has been found that the iron oxide content of a catalyst employed in the so-called fluidized catalytic cracking process is related to the gas and carbon producing characteristics of the catalyst. In other words, a catalyst containing substantial amounts of contaminating metals or metal compounds such as iron oxide will cause the formation of substantial amounts of gas and carbon. This is disadvantageous since production of excessive amounts of gas and carbon reduces the amount of useful products obtainable in the cracking reaction. It will thus be seen that the practice of the present invention allows substantial increases in the activity of the catalyst towards producing useful products by reducing the tendency of the catalyst to produce excessive amounts of gas and carbon.

The catalyst which may be treated in accordance with the present invention will ordinarily be the usual silica-alumina catalyst employed in conventional fluidized catalyst cracking units. However, other catalysts may similarly be treated with halogenated derivatives of hydrocarbons.

From the results given in the specific example, it will be seen that the activity of a catalyst for the catalytic cracking operation may be substantially improved by treating the regenerated catalyst with vaporized carbon tetrachloride at high temperatures to reduce the contaminating metallic content thereof.

The exact reason for the improvement in the activity of the catalyst is not known. As a postulate advanced to explain the improvement, it is suggested that the contaminating iron in the catalyst is converted to an iron chloride and at least a portion thereof is sublimed from the catalyst at the high temperature of treatment thereby reducing the iron content of the catalyst. It is to be understood, however, that the present invention is directed to a method for improving the activity of a catalyst by regenerating the catalyst in the presence of oxygen at a high temperature and subsequently removing metallic contaminants from at least a portion of the regenerated catalyst by contacting it with vaporized carbon tetrachloride at high temperatures and I do not intend to be limited by any theory or explanation of the improved results obtained.

In the practice of the present invention, it is important that the catalyst which is subjected to treatment with anhydrous carbon tetrachloride be in a regenerated condition. The term regenerated means that the catalyst has been subjected to a combustion operation to remove substantially all of the carbon deposited thereon during the conversion operation. If a catalyst were treated, in accordance with the present invention, which included a substantial quantity of carbon, the carbon tetrachloride might react with the alumina in the silica-alumina catalyst to form aluminum chloride which would be lost from the system, thus depleting the catalyst of alumina. Also, when a catalyst comprising substantial quantities of carbon is treated with anhydrous carbon tetrachloride, the reaction rate is considerably decreased. Thus, too much emphasis cannot be laid on the substantial removal of carbon from the catalyst prior to its treatment as disclosed and claimed hereinafter.

While the invention has been described with respect to the so-called fluid catalyst technique, it is within the spirit and scope of my invention to treat with vaporized carbon tetrachloride, or other halogenated hydrocarbon derivative, any catalyst circulated in cracking operations involving cracking and regeneration zones.

Having fully described and illustrated the present invention, what I desire to claim is:

In a catalytic cracking process wherein finely divided solid silica-alumina catalyst is intimately contacted with hydrocarbons in a cracking zone under conditions to cause cracking of at least a portion of the hydrocarbons and wherein said catalyst is withdrawn from the cracking zone to a catalyst regeneration zone, the steps of contacting the catalyst with a hot combustion supporting gas in the regeneration zone, withdrawing a substantial portion of the catalyst from the regeneration zone and contacting it with vaporized carbon tetrachloride under anhydrous conditions at a temperature in the range of 600° to 1200° F. to remove metallic compounds therefrom, separating at least a major portion of the vaporized carbon tetrachloride from the treated catalyst, subsequently returning the contacted catalyst to the catalyst regeneration zone and recycling catalyst from the catalyst regeneration zone to the cracking zone.

JOSEPH A. SNYDER.

REFERENCES CITED

The following references are of record in the file of this patent:

UNITED STATES PATENTS

| Number | Name | Date |
| --- | --- | --- |
| 2,113,028 | Kuentzel | Apr. 5, 1938 |
| 2,246,900 | Schulze et al. | June 24, 1941 |
| 2,380,731 | Drake et al. | July 31, 1945 |
| 2,430,724 | Meadow | Nov. 11, 1947 |